US012260610B2

(12) United States Patent
Lee et al.

(10) Patent No.: US 12,260,610 B2
(45) Date of Patent: Mar. 25, 2025

(54) DUAL DESCRIPTOR DATA FOR OBJECT RECOGNITION IN LOW LIGHT CONDITIONS

(71) Applicant: ObjectVideo Labs, LLC, Tysons, VA (US)

(72) Inventors: Sung Chun Lee, Fairfax, VA (US); Gang Qian, McLean, VA (US); Sima Taheri, McLean, VA (US); Sravanthi Bondugula, Vienna, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 16 days.

(21) Appl. No.: 18/123,439

(22) Filed: Mar. 20, 2023

(65) Prior Publication Data
US 2023/0306712 A1 Sep. 28, 2023

Related U.S. Application Data

(60) Provisional application No. 63/323,133, filed on Mar. 24, 2022.

(51) Int. Cl.
*G06V 10/75* (2022.01)
*G06T 7/246* (2017.01)
(Continued)

(52) U.S. Cl.
CPC ............ *G06V 10/751* (2022.01); *G06T 7/248* (2017.01); *G06V 10/60* (2022.01); *G06V 10/764* (2022.01);
(Continued)

(58) Field of Classification Search
None
See application file for complete search history.

(56) References Cited

U.S. PATENT DOCUMENTS 11,106,903 B1 * 8/2021 Huynh .................... G06V 10/82
11,165,954 B1 * 11/2021 Beach ..................... H04N 23/65
(Continued)

FOREIGN PATENT DOCUMENTS

EP 3572972 A1 * 11/2019 ............. G01N 21/01

OTHER PUBLICATIONS

Wu et al., "RGB-Infrared Cross-Modality Person Re-Identification," Computer Vision Foundation, pp. 5380-5389, 2017. (Year: 2017).*

*Primary Examiner* — Hung Q Dang
(74) *Attorney, Agent, or Firm* — Fish & Richardson P.C.

(57) ABSTRACT

Methods, systems, and apparatus, including computer programs encoded on computer storage media, for using dual descriptor data. One of the methods includes: detecting, using a first set of descriptor features included in dual descriptor data, a first representation within first image data collected by a camera; determining a change to an imaging modality of the camera; detecting, using a second set of features included in the dual descriptor data, a second representation within second image data collected by the camera; classifying the first representation and the second representation as associated with a same object using the dual descriptor data; and in response to classifying the first representation and the second representation as associated with the same object using the dual descriptor data, transmitting operational instructions to one or more appliances connected to the system.

20 Claims, 7 Drawing Sheets

(51) Int. Cl.
*G06T 7/292* (2017.01)
*G06V 10/143* (2022.01)
*G06V 10/60* (2022.01)
*G06V 10/74* (2022.01)
*G06V 10/764* (2022.01)
*G06V 10/94* (2022.01)
*G06V 20/52* (2022.01)
*H04N 23/11* (2023.01)
*H04N 23/90* (2023.01)
*H04N 23/667* (2023.01)

(52) U.S. Cl.
CPC ............ *G06V 10/945* (2022.01); *G06V 20/52* (2022.01); *H04N 23/11* (2023.01); *G06T 2207/10024* (2013.01); *G06T 2207/10048* (2013.01); *G06T 2207/30232* (2013.01); *H04N 23/667* (2023.01)

(56) References Cited

U.S. PATENT DOCUMENTS

| | | | | |
|---|---|---|---|---|
| 11,544,505 | B1* | 1/2023 | Beach | G06F 18/23211 |
| 11,574,484 | B1* | 2/2023 | Linzer | G06T 7/521 |
| 11,836,224 | B2* | 12/2023 | Huang | G06N 3/08 |
| 2009/0002517 | A1* | 1/2009 | Yokomitsu | H04N 23/88 |
| | | | | 348/E9.037 |
| 2009/0154778 | A1* | 6/2009 | Lei | G06V 30/413 |
| | | | | 382/112 |
| 2012/0027249 | A1* | 2/2012 | Brown | G06V 10/446 |
| | | | | 382/103 |
| 2018/0165829 | A1* | 6/2018 | Hong | G06V 10/772 |
| 2018/0308242 | A1* | 10/2018 | Honjo | G06T 7/251 |
| 2019/0159030 | A1* | 5/2019 | Lim | H04L 9/3226 |
| 2020/0250854 | A1* | 8/2020 | Toyoshi | G06T 7/0002 |
| 2021/0133474 | A1* | 5/2021 | Sawada | G06N 3/045 |
| 2021/0191977 | A1* | 6/2021 | Madden | G06V 40/103 |
| 2021/0334580 | A1* | 10/2021 | Crescitelli | G06V 10/806 |
| 2021/0334581 | A1* | 10/2021 | Gandara | G06V 40/193 |
| 2022/0094847 | A1* | 3/2022 | Yang | G06T 5/60 |
| 2022/0101066 | A1* | 3/2022 | Bondugula | G06V 10/82 |
| 2022/0172452 | A1* | 6/2022 | Wang | G06V 10/56 |
| 2022/0268890 | A1* | 8/2022 | Yokoyama | G01S 7/4866 |
| 2022/0284228 | A1* | 9/2022 | Li | G06V 10/143 |
| 2023/0191608 | A1* | 6/2023 | Horowitz | B25J 9/163 |
| | | | | 700/245 |
| 2024/0155221 | A1* | 5/2024 | Watanabe | H04N 23/90 |

* cited by examiner

DUAL DESCRIPTOR DATA FOR OBJECT RECOGNITION IN LOW LIGHT CONDITIONS

CLAIM OF PRIORITY

This application claims priority under 35 USC § 119 (e) to U.S. Patent Application Ser. No. 63/323,133, filed on Mar. 24, 2022, the entire contents of which are hereby incorporated by reference.

TECHNICAL FIELD

This disclosure relates to home monitoring technology.

BACKGROUND

Object recognition involves using computer vision techniques to identify objects in images or videos. For example, object recognition can be an output of deep learning and machine learning algorithms. Object recognition is sometimes employed by computers to gain a level of understanding of information contained in data (e.g., video data, image data) to identify objects.

Object detection and object recognition are similar techniques for identifying objects but vary in execution. Object detection refers to the process of finding instances of objects in images. In the case of deep learning, object detection is often a subset of object recognition, where the object is not only identified but also located in an image. This allows for multiple objects to be identified and located within the same image.

SUMMARY

This disclosure is focused on systems and techniques to improve object recognition using image data captured with different imaging modalities. For example, a security camera in a property may have different capture modes based on time-of-day (e.g., capturing red-green-blue (RGB) data during daytime, capturing infrared (IR) data during nighttime). However, the appearance of objects in different types of image data may vary and thereby may impact object recognition performance, for instance, when tracking an object during a transitional period (e.g., a time period during which a camera adjusts a capturing mode to accommodate for changes in ambient lighting conditions). During such transitional periods, the camera may not necessarily be capable of accurately recognizing and/or tracking objects if object features associated with each imaging modality are different.

The systems and techniques described throughout improve objection recognition performance through use of dual descriptor data. The dual descriptor data may specify features and/or feature associations that enable a camera to identify and track detected objects in different types of image data. As described herein, "dual descriptor data" refers to data structures representing associations of object features in two or more imaging modalities. For example, a security camera may collect RGB image data using a color image sensor and IR image data using an IR sensor. In this example, dual descriptor data may refer to a collection of templates each include object attributes of a particular imaging modality (e.g., known RGB attributes of an object and known IR attributes of the same object).

Reference to dual descriptor data referenced throughout can be on a per-object basis (e.g., object-specific dual descriptor data) or, alternatively, a collection of objects (e.g., dual descriptor data for a set of objects). In some other instances, dual descriptor data can be made property-specific (e.g., dual descriptor data for a set of objects detected in a property). This disclosure contemplates different types of data formats and/or data structures representing dual descriptor data, and thus, examples of dual descriptor features referenced throughout this disclosure are not intended to limit the scope of information represented by dual descriptor data.

In some implementations, a system uses dual descriptor data to improve object recognition and/or tracking during transitional periods when a capture device adjusts an imaging modality used to capture data. For example, an external security camera of a property may capture image data using RGB sensor or an IR sensor depending on ambient lighting conditions in the vicinity of the security camera. In some instances, the security camera may be configured to adjust image capture dynamically (e.g., in real-time or substantially in real-time) based on a detected lighting condition. In such instances, image data captured during a certain time period during which an event that adjusts lighting condition (e.g., a user turning on a light switch) can include both RGB data and IR data.

The system can be configured to use dual descriptor data in such instances to improve the recognition and/or tracking of a detected object. For example, using dual descriptor data, the system can identify detected object representations in RGB data and IR data and associate the detected representations as corresponding to the same object even attributes associated with each detected representation may be dramatically different. In this way, dual descriptor data enables the system to use associated object attributes in different imaging modalities to improve recognition and tracking in relation to dynamic lighting conditions.

In general, innovative aspects of the subject matter described in this specification can be embodied in methods that include the actions of: detecting, using a first set of descriptor features included in dual descriptor data, a first representation within first image data collected by a camera; determining a change to an imaging modality of the camera; detecting, using a second set of features included in the dual descriptor data, a second representation within second image data collected by the camera; classifying the first representation and the second representation as associated with a same object using the dual descriptor data; and in response to classifying the first representation and the second representation as associated with the same object using the dual descriptor data, transmitting operational instructions to one or more appliances connected to the system.

In some implementations, the camera includes an RGB sensor and an IR sensor, the change to the imaging modality of the camera includes a change in using the IR sensor to the RGB sensor or in using an RGB sensor to an IR sensor.

In some implementations, the operations further include detecting, by the camera, a change in lighting conditions. Determining the change to the imaging modality of the camera can be in response to detecting the change in the lighting conditions.

In some implementations, classifying of the first representation and the second representation as associated with the same object using the dual descriptor data includes determining that object features of the same object satisfy a threshold for resembling object features used in generating the dual descriptor data.

In some implementations, the first representation has a first location in the first image data, and the second representation has a second location in the second image data, and the first and second locations (i) are different and (ii) indicate movement.

In some implementations, the classifying of the first representation and the second representation as associated with the same object using the dual descriptor data uses a time period between capturing the first and second image data.

In some implementations, the operations further include providing, to a user device, a notification asking for confirmation that the first representation and the second representation are associated with the same object.

In some implementations, the operations further include receiving, from the user device, feedback indicating that the first representation and the second representation are associated with the same object.

In some implementations, the detecting, using the second set of features specified in the dual descriptor data, of the second representation within second image data includes: determining that a descriptor template is not specified for the second image data; in response to determining that a descriptor template is not specified for the second image data, initiate a bounding box registration process, thereby generating a new descriptor template; and updating the dual descriptor data with the new descriptor template.

In some implementations, the operations further include generating the dual descriptor, which includes: determining a first bounding box in first image data collected by the camera; determining a change to an imaging modality of the camera; determining a second bounding box in second image data collected by the camera; determining an overlapping region between the first bounding box and the second bounding box; and generating the dual descriptor for an object associated with the overlapping region.

In some implementations, the dual descriptor for the object includes object attributes in different imaging modalities with the object.

In some implementations, the operations further include determining that the object is unrecognized to the system. The determining of the first bounding box in the first image data can be in response to determining that the object is unrecognized.

In some implementations, the operations further include providing, to a user device, a notification asking for confirmation that a representation within the first bounding box and a representation within the second bounding box correspond to a same object.

In some implementations, the operations further include receiving, from the user device, feedback indicating that a representation within the first bounding box and a representation within the second bounding box correspond to a same object.

In some implementations, the operations further comprise: determining that the object is recognized to the system; comparing the generated dual descriptor for the object with a feature template of the dual descriptor; and updating the feature template of the dual descriptor with the generated dual descriptor.

Implementations of the described techniques may include hardware, a method or process implemented at least partially in hardware, or a computer-readable storage medium encoded with executable instructions that, when executed by a processor, perform operations.

The subject matter described in this specification can be implemented in various embodiments and may result in one or more of the following advantages. In some implementations, the performance of an object recognition model can improve in circumstances, e.g., at least by improving object recognition accuracy by factoring in lighting conditions. This can be beneficial because earlier object recognition models could fail to or incorrectly identify an object during transitional times of day, e.g., when lighting conditions are changing. In some implementations, the performance of object tracking can be improved at last by improving the accuracy of tracking objects in ambient light conditions, dark lighting conditions, or a combination of the two. These improvements can be realized in several ways including, e.g., by using a camera coupled to an RGB or IR sensor.

In some implementations, using a dual descriptor can reduce a likelihood of the system triggering a false alarm. For example, a conventional system might be able to recognize a resident during the day during ambient lighting conditions based on various attributes. However, if the system has not recognized the resident at night, the system might mistake the resident for an unknown person in dark lighting conditions, which could trigger a false alarm. Through using a dual descriptor, however, the system can learn to associate object attributes that vary with lighting conditions with the same object.

In some implementations, the system using dual descriptors can spend less time training an object recognition model to recognize objects in various lighting conditions compared to a conventional system. For example, if the system can leverage already learned characteristics that do not vary with lighting conditions, e.g., size, so that training related to these type of characteristics is not duplicated. In some implementations, the system can more quickly identify an object when the lighting conditions change, since the system can associate the same object with different attributes that depend on the lighting conditions.

In some implementations, using a dual descriptor can conserve memory resources of a system. For example, conventional object recognition systems might identify a single object as two distinct objects based on the lighting conditions, since the object can appear to have different colors or textures with different imaging modalities, e.g., using RGB or IR sensors, although certain attributes, e.g., height, remain the same. Storing feature attributes for a single object with dual descriptors instead of two distinct objects can reduce the amount of memory associated with an object, since attributes that do not depend on the lighting conditions, e.g., height, will not be duplicated in storage.

By improving accuracy, reducing false alarms, realizing faster times for training models and for object recognition, or a combination of these, the object identification and tracking system can further realize additional benefits. For instance, the processing load on the system can be reduced because improved object recognition and tracking results in fewer false alarms and thus less alarm messages are generated and transmitted to users, and less unnecessary actions are recommended to the user, thereby resulting in an improved user experience. More sophisticated model training techniques can reduce duplication and redundancies thereby freeing system resources for other processing tasks. These advantages can be particularly beneficial for implementations in which a large volume of image data is collected, e.g., monitoring systems collecting image data for security or other purposes. Due to the large volume of image data that has to be continuously processed, the benefits described above can result in a substantial difference in the performance of such monitoring systems both in terms of improved system efficiencies and object recognition and tracking.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

In general, this disclosure is focused on techniques to improve object recognition using image data captured with different imaging modalities. For example, a security camera in a property may have different capture modes based on time-of-day (e.g., capturing red-green-blue (RGB) data during daytime, capturing infrared (IR) data during nighttime). However, the appearance of objects in different types of image data may vary and thereby may impact object recognition performance, for instance, when tracking an object during a transitional period (e.g., a time period during which a camera adjusts a capturing mode to accommodate for changes in ambient lighting conditions). During such transitional periods, the camera may not necessarily be capable of accurately recognizing and/or tracking objects if object features associated with each imaging modality are different.

Figure 1A:
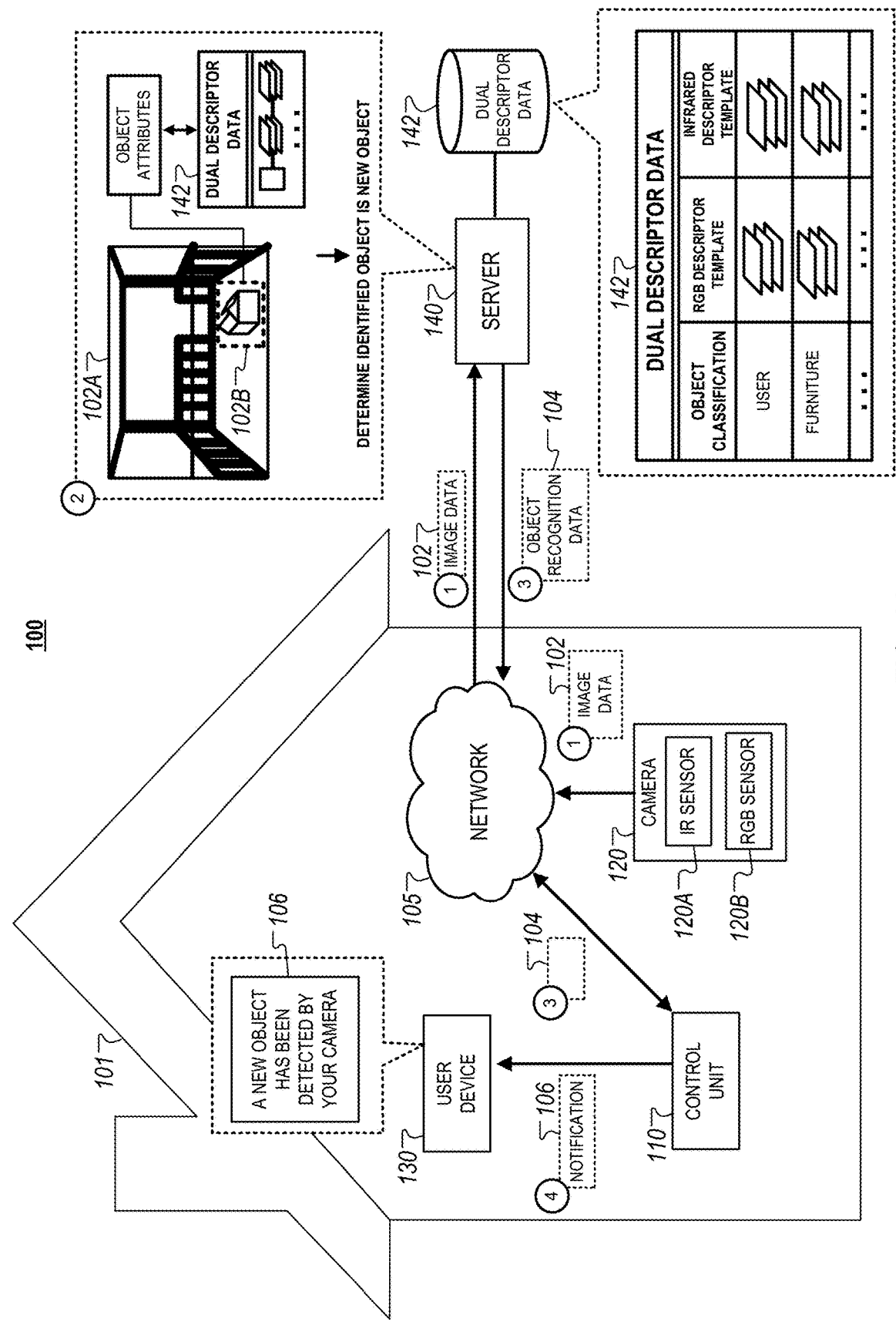
FIGS. 1A and 1B show an example of a system configured to use dual descriptor data for object recognition.
Figure 1B:
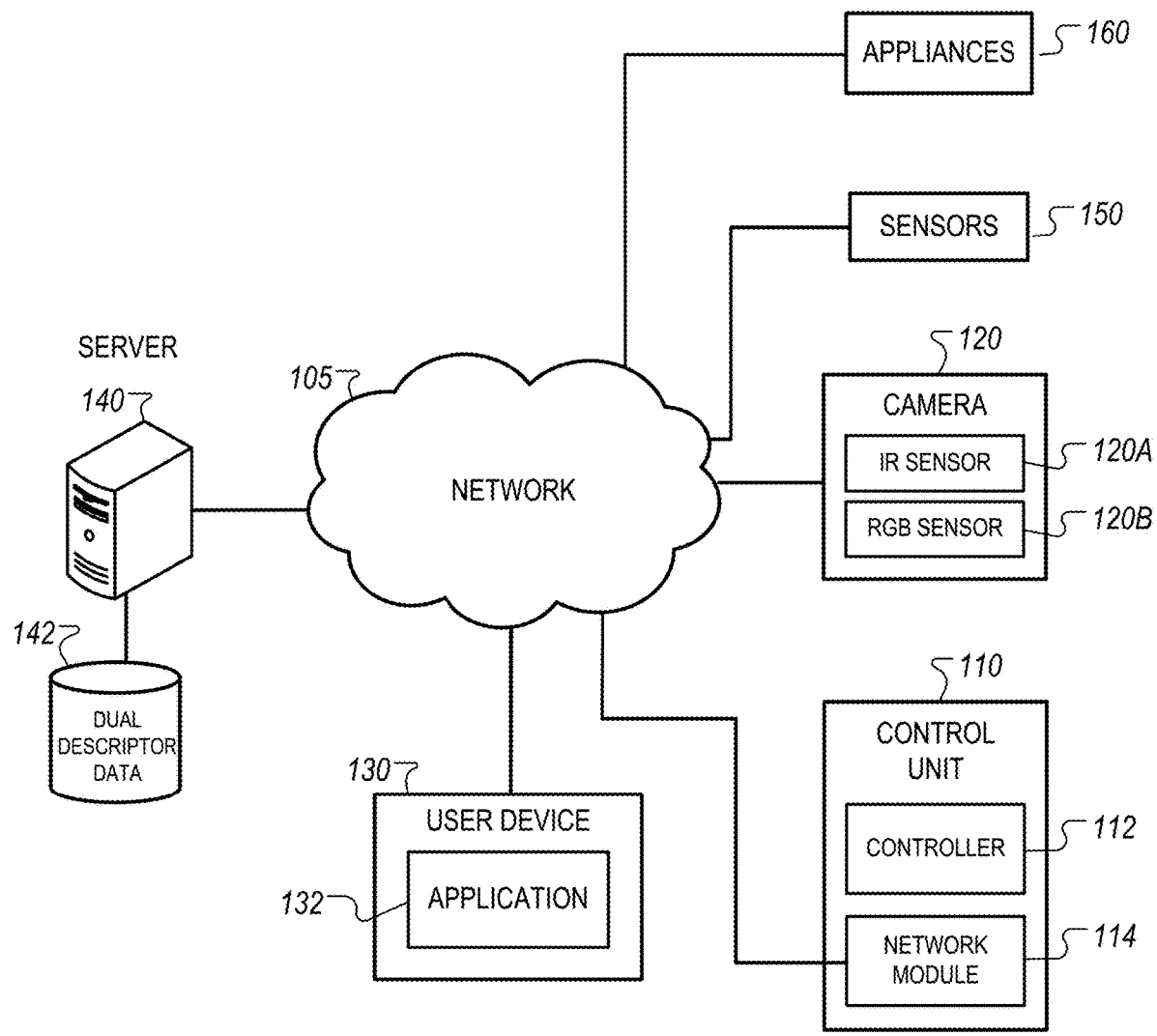

FIGS. 1A and 1B show an example of a system 100 configured to use dual descriptor data for object recognition. FIG. 1A shows an example of a technique in which the system 100 uses dual descriptor data to improve object recognition. FIG. 1B illustrates components of the system 100. The system 100 performs the technique shown in FIG. 1A to improve object recognition in relation to monitoring a property 101. As shown, the system 100 includes several components, such as control unit 110, camera 120, user device 130, and server 140. Components of system 100 exchange communications over network 105. Additionally, camera 120 includes IR sensor 120A and RGB sensor 120B. Server 140 stores dual descriptor data 142 used for object recognition. Components of system 100 are described in reference to FIG. 1B.

The technique shown in FIG. 1A proceeds in a set of steps. At step (1), camera 120 collects image data 102, which is relayed to server 140. In the example, image data 102 includes a set of frames represented by video data collected by camera 120. Camera 120, in this example, is an outdoor security camera with a field of view of a porch of property 101. Camera 120 can collect the image data 102 perpetually on an on-going basis, or alternatively, in relation to a trigger event, such as detection of motion, change in lighting conditions, recognition of a known or unknown object, among others. As shown in FIG. 1A, image data 102 includes a frame 102A with an identified object 102B.

Figure 2A:
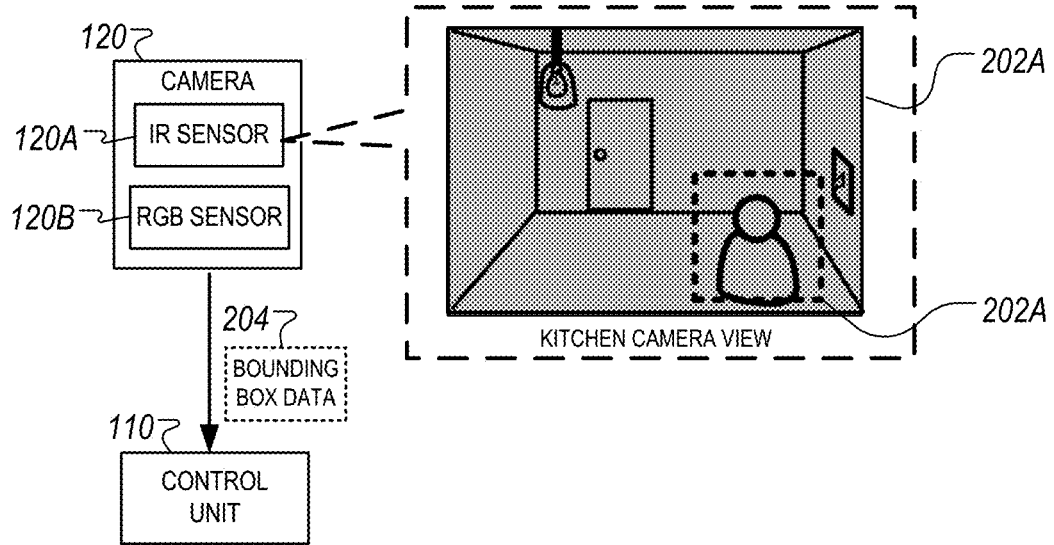
FIGS. 2A and 2B shows an example of a technique for generating dual descriptor data for object recognition.
Figure 2A:
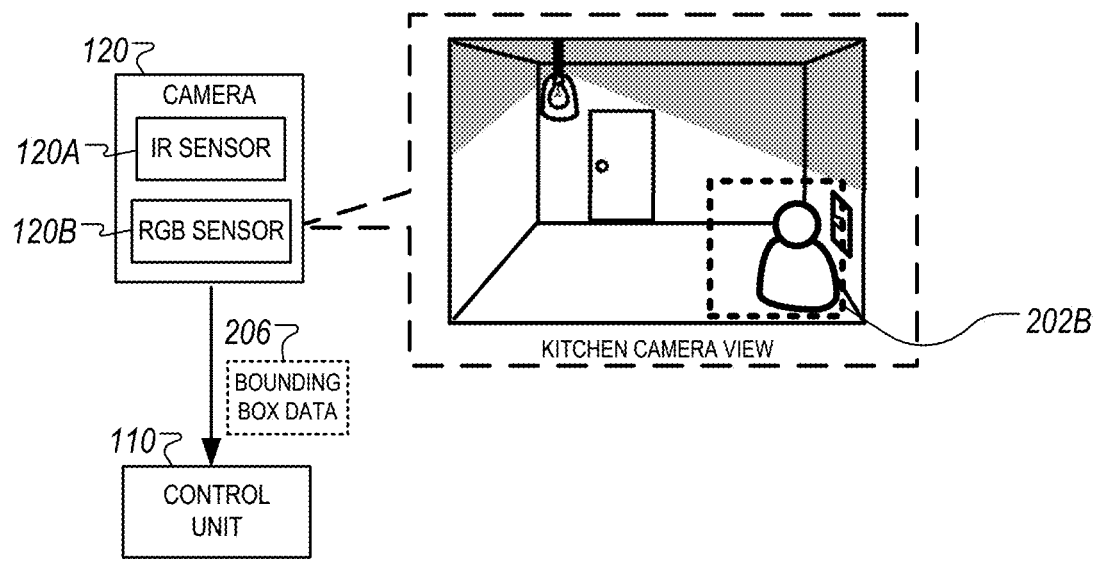
Figure 2B:
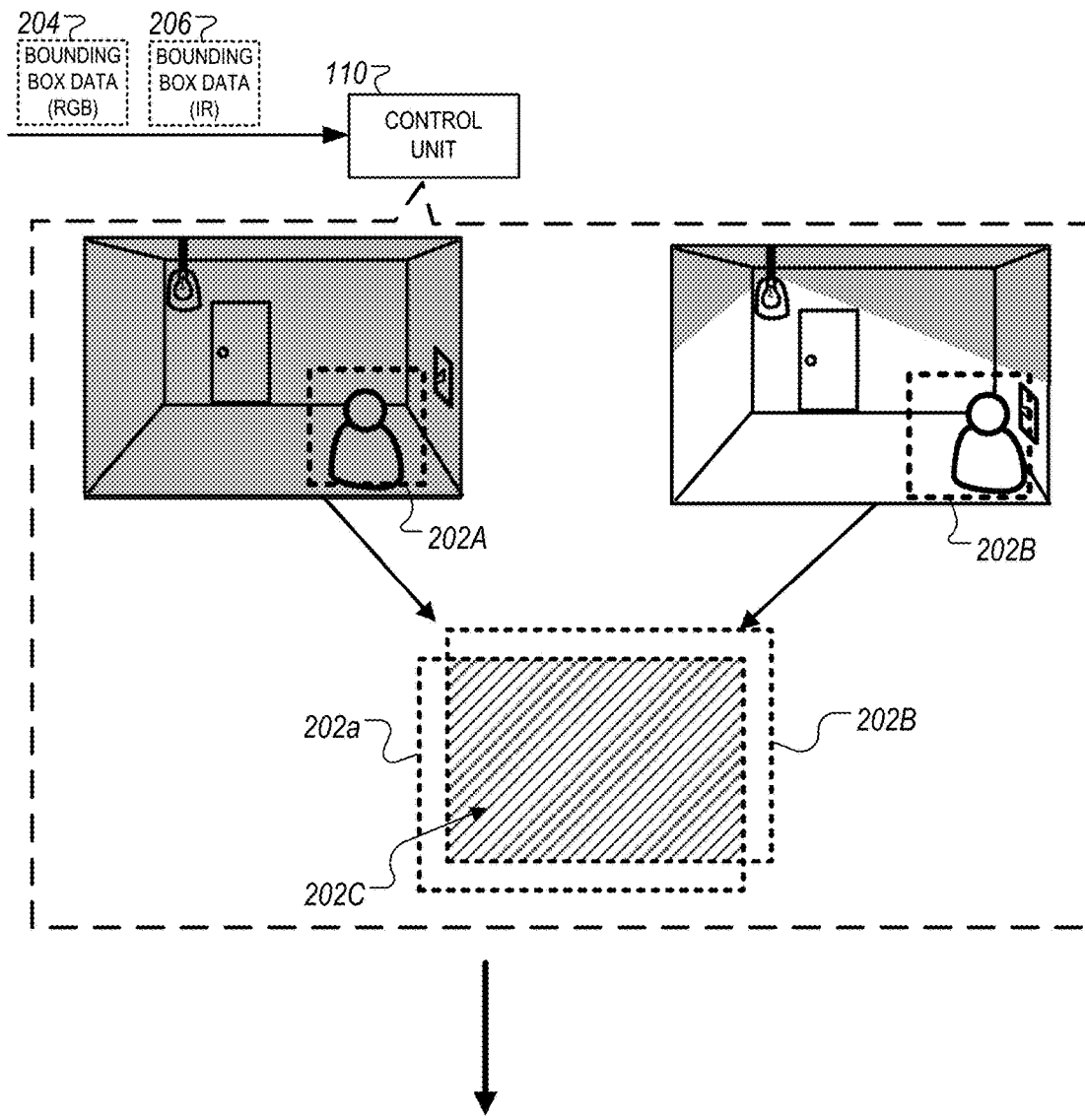
Figure 2B:
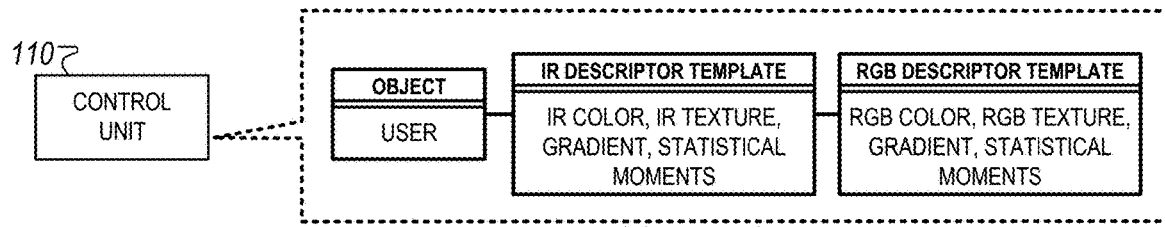

At step (2), server 140 uses dual descriptor data 142 to determine if a detected object 102B within image data 102 is a newly detected object. As shown, dual descriptor data 142 includes a table associating two sets of feature templates (RGB descriptor features, IR descriptor features) for a set of known (or detected) objects in property 101, such as "USER" and "FURNITURE." In this example, system 100 maintains dual descriptor data 142 for multiple recognized objects associated with property 101. Templates specified by the dual descriptor data 142 can be associated with the same object using a registration process. For example, bounding boxes may be used to identify features in different imaging modalities that are known to be associated with the same object (as shown in FIGS. 2A and 2B). In some instances, dual descriptor data 142 can be generated and updated periodically based on updates to recognized updates and/or presentation of object features in image data 102 collected by camera 120.

At step (3), server 140 provides object recognition data 104 to control unit 110 over network 105. Object recognition data 104 can specify a recognition result generated by server 140 using applying dual descriptor data 142. As one example, server 140 may use image processing techniques to identify features associated with pixels in frame 102A corresponding to object 102B. Server 140 can then compare the identified features against those specified in feature templates of dual descriptor data 142. In this example, if server 140 determines correspondence between the two, then object 102B can be confirmed as a recognized object, such as "PACKAGE," which is then reflected in object recognition data 104. Alternatively, if server 140 is unable to determine correspondence, then object 102B may be identified as a new (or unrecognized) object. In such circumstances, system 100 may generate a task to use a registration procedure to generate dual descriptor data for the new object. In other examples, server 140 may use dual descriptor data 142 to track a recognized object when there is a change in lighting conditions (and an imaging modality used by camera 120 to capture image data 102). In such examples, the dual descriptor data 142 can be used to confirm that objects identified in different types of images correspond to the same object.

At step (4), control unit 110 provides notification 106 to user device 130. As shown, notification 106 provides an indication to a user that a new object has been detected by camera 120. As discussed above, system 100 determines that object 102B is an unrecognized object since features extracted from frame 102A do not have correspondence with those specified in feature templates in dual descriptor data 142.

FIG. 1B is a block diagram of an example of system 100. In this example, system 100 includes control unit 110, camera 120, user device 130, server 140, sensors 150, and appliances 160. The components of system 100 shown in FIG. 1B communicate over network 105. Control unit 110 includes controller 112 and network module 114. Camera 120 includes IR sensor 120A and RGB sensor 120B. User device 130 runs an application 132 that, in some instances, can be associated with server 140.

The network 105 may be configured to enable electronic communications between electronic devices. For example, the network 105 may be configured to enable exchange of electronic communications between control unit 110, camera 120, user device 130, server 140, sensors 150, and appliances 160. The network 105 may include local area networks (LANs), Wi-Fi, or analog or digital wired and wireless networks. The network 105 may include multiple networks or subnetworks, each of which may include, for example, a wired or wireless data pathway. The network 105 may also include a circuit-switched network, a packetswitched data network, or any other network able to carry electronic communications (e.g., data or voice communications). For example, the network 105 may include networks based on the Internet protocol (IP), or other comparable technologies. In some examples, the network 105 may include wide area networks (WAN) of computers that receive services provided by a service provider.

The control unit 110 can be a computing device that controls aspects of monitoring operations performed by the components of the system 100. Controller 112 can be configured to control, for example, generating dual descriptor data based on image data collected by camera 120. In some examples, controller 112 includes a processor or other control circuitry configured to execute instructions of a program that controls operation of the system 100. In these examples, controller 112 can be configured to receive input from camera 120, user device 130, sensors 150, appliances 160, or other devices associated with the system 100 and control operation of components of the system 100. For example, controller 112 may be configured to control operation of the network module included in the control unit 110.

Network module 114 can be a communication device configured to exchange communications over the network 105. Network module 114 can be a wireless communication module configured to exchange wireless communications over network 105. For example, network module 114 can be a wireless communication device configured to exchange communications over a short-range wireless network. Network module 114 can also be configured to exchange communications over network 105 using a wireless connection. For instance, network module 114 can enable control unit 110 to exchange communications with server 140 over network 105. The wireless communication device can include one or more GSM modules, radio modem, cellular transmission module, or any type of module configured to exchange communications in one of the following formats: LTE, GSM or GPRS, CDMA, EDGE or EGPRS, EV-DO or EVDO, UMTS, IP, or Wi-Fi.

Network module 114 can also be a wired communication module configured to exchange communications over network 105 using a wired connection. For instance, network module 114 can be a modem, a network interface card, or another type of network interface device. Network module 114 can be an Ethernet network card configured to enable control unit 110 to communicate over a local area network and/or the Internet. Network module 114 can also be a voiceband modem configured to enable an alarm panel to communicate over the telephone lines of Plain Old Telephone Systems (POTS). In some implementations, the alarm panel may be a broadband or cellular gateway where the network module may enable control unit 110 to communicate over network 105.

Control unit 110 can communicate devices located in property 101. For example, control unit 110 can communicate with camera 120, user device 130, server 140, sensors 150, and appliances 160 over network 105. In some instances, control unit 110 may periodically receive image data from camera 120 or other types of monitoring data from user device 130, sensors 150, and appliances 160. The data activity reports can include information related to property 101, such as occupancy data, activity data, movement data, temperature data, among others.

Camera 120 can be a capture device that collects image data (e.g., photographs, video) of property 101. For example, camera 120 can be an exterior security camera that captures image data in the vicinity of a front door of property 101. Captured image data can be processed for object recognition and/or tracking. For example, as discussed in reference to FIG. 1A, features of an object detected in image data can be processed in relation to features specified in dual descriptor data 142 to determine whether the detected object is a recognized object (a detected previously detected by system 100) or a new, unrecognized object.

Camera 120 can include multiple types of sensors for collecting image data using different imaging modalities. In the example depicted in FIG. 1A, camera 120 includes IR sensor 120A and RGB sensor 120B for collecting IR image data and RGB image data, respectively. In other examples, camera 120 can additionally or alternatively include sensors for collecting other types of image data, such as thermal image data, light detection and ranging (LIDAR) data, among others. In such examples, dual descriptor data 142 can be used to associate object attributes amongst different imaging modalities, as discussed throughout.

User device 130 can be a computing device associated with a user, such as a smartphone, a tablet computing device, a laptop, or a desktop computing device. User device 130 can be configured to run an application 132 (e.g., a mobile application associated with server 140 acting as an application server) that provides the user with access to functionality relating to camera 120. For example, the user can use user device 130 to access image data that permits remote control of the camera 120 (via control unit 110 to relay commands to camera 120).

Server 140 can be an electronic device configured to provide monitoring services by exchanging electronic communications with control unit 110, camera 120, user device 130, sensors 150, and appliances 160 over network 105. For example, server 140 can be configured to monitor events, e.g., image data with detected objects collected by camera 120. In this example, server 140 may exchange electronic communications with the network module included in control unit 110 to receive information regarding events detected by control unit 110. Server 140 can also receive information regarding events from camera 120, e.g., image data with detected objects.

Server 140 stores dual descriptor data 142 that can be used for improving object recognition. As described throughout, dual descriptor data 142 can include associations of object features in two or more imaging modalities. For example, dual descriptor data 142 can include templates specifying a first set of features associated with IR image data (using image data collected by IR sensor 120A) and a second set of features associated with RGB image data (using image data collected by RGB sensor 120B).

Sensors 150 may include various types of sensors that are placed within a property. For example, sensors 150 can include a contact sensor, a motion sensor, a glass break sensor, an occupancy sensor, an activity sensor, or any other type of sensor that is typically included in a monitoring system or security system. Sensors 150 also can also include environmental sensors such as an ambient temperature sensor, a water sensor, a rain sensor, a wind sensor, a light sensor, a smoke detector, a carbon monoxide detector, an air quality sensor, etc.

Appliances 160 can be home automation devices connected to network 105 that are configured to exchange electronic communications with other devices of system 100. Appliances 160 may include, for example, connected kitchen appliances, controllable light sources, safety and security devices, energy management devices, and/or other types of electronic devices capable of exchanging electronic communications over network 105. In some instances, appliances 160 may periodically transmit information and/or generated data to control unit 110 such that control unit 110 can automatically control the operation of appliances 160 based on the exchanged communications. For example, control unit 110 can operate one or more of appliances 160 based on a fixed schedule specified by the user. In another example, control unit 110 may enable or disable one or more of appliances 160 based on received sensor data from sensors 150.

FIGS. 2A and 2B shows an example of a technique for generating dual descriptor data for object recognition. The technique proceeds in a set of steps shown in the figures. Referring initially to FIG. 2A, at step (1), IR sensor 120A of camera 120 collects IR image data at a first time (10:05 PM). At this first time, low ambient lighting conditions in the kitchen (lights turned off) results in camera 120 using IR sensor 120A to collect image data 202. As shown in the figure, image data 202 includes a field of view of the kitchen and includes a user as an identified object. A region of image data 202 corresponding to the user is represented by bounding box 202A. Bounding box 202A is used to and identify features and/or attributes for object identification and/or recognition. For example, pixel data within bounding box 202A can be extracted to identify representative attributes that are used as indicators for a corresponding object.

At step (2), the user interacts with a light switch and turns on a ceiling light fixture. This changes the lighting conditions in the kitchen, which prompts camera 120 to change its operating mode for collecting image data. At step (3), RGB sensor 120B of camera 120 collects RGB image data at a second time (10:07 PM). At this second time, the kitchen is being light by the ceiling light fixture. The user remains in the field of view and, given the new lighting conditions, is visible in an RGB image collected by RGB sensor 120B of camera 120.

At step (4), control unit 110 processes bounding box data 204, 206 associated with IR image data and RGB image data, respectively, to identify an overlapping region 204C. The overlapping region 204C of bounding box data 204, 206 each include a representation of a user and given the short time difference between time points when images were captured (10:05 PM to 10:07 PM) there is a high confidence that the representations are of the same user. The features extracted from a region of each image corresponding to the overlapping region can be used to develop correlations.

At step (5), control unit 110 generates dual descriptor data using the overlapping region of bounding box data 204, 206. As described throughout, dual descriptor data associates objects attributes (e.g., color, texture, gradient, statistical moments) in different imaging modalities with the same object. In the example shown in the figure, the object is a user detected by camera 120 in the kitchen. Dual descriptor data, in this example, associates attributes identified in IR image data (collected when the kitchen lights are turned off) and RGB image data (collected when kitchen lights are turned on). As described throughout, once the dual descriptor data is generated, information specified within the dual descriptor data can be used to improve recognition of the user in different imaging modalities. For instance, the dual descriptor data can be applied to subsequently improve object recognition the next time lighting conditions change over a specified time period.

Figure 3:
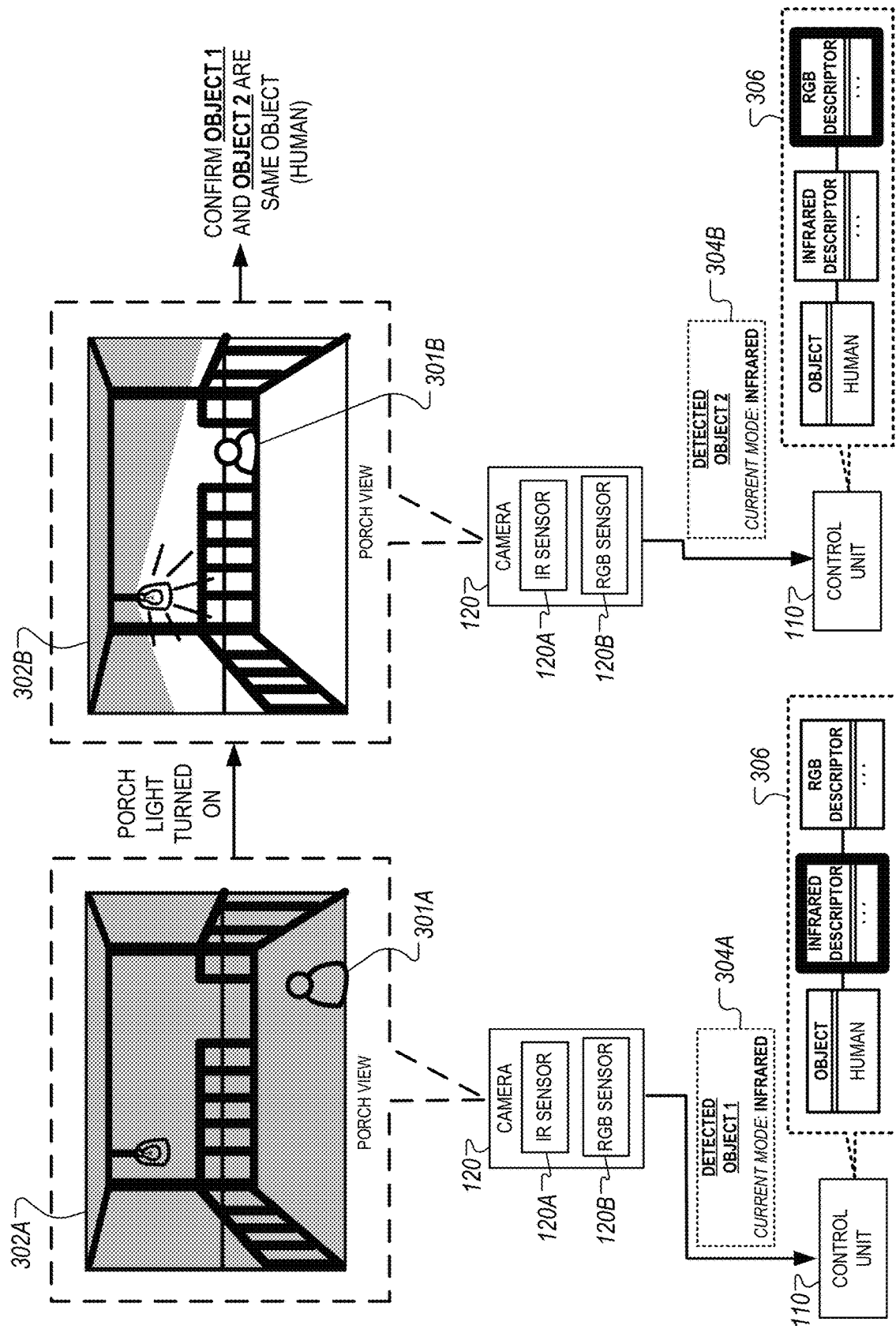
FIG. 3 shows an example of a technique for using dual descriptor data to improve object recognition during a change of lighting conditions.

FIG. 3 shows an example of a technique for using dual descriptor data 306 to improve object recognition during a change in lighting conditions. In this example, dual descriptor data 306 improves tracking a user as he/she moves in a front porch of a property. This accomplished by an association of IR and RGB descriptor features for a particular object type or classification ("HUMAN"). In some instances, the technique shown in FIG. 3 is performed after the technique shown in FIGS. 2A and 2B.

At a first time, camera 120 collects image data 302A when there is low light near the porch. Image data 302A is collected by IR sensor 120A since the camera 120 is operating in IR mode due to present lighting conditions. In this circumstance, control unit 110 uses the IR descriptor within dual descriptor data 306 to recognize detected object representations. Control unit 110 thereby recognizes representation 301 within image data 302A as a human based on attributes specified by the IR descriptor of dual descriptor data 306.

After image data 302A is collected, lighting conditions near the front porch are adjusted (e.g., based on user movement, motion detection near the front porch). The change in lighting conditions adjusts the operating mode of camera 120 (e.g., from IR mode to RGB mode) given the increased amount of light produced by the porch light and collects image data 302B using RGB sensor 120B. When image data 302B is collected, the user has moved to a different location on the front porch within a field of view of camera 120 (e.g., from the front door to the stairs). In this circumstance, control unit 110 uses the RGB descriptor within dual descriptor data 306 to recognize detected objects. Control unit 110 thereby recognizes representation 301B within image data 302B as a human based on attributes specified by the IR descriptor of dual descriptor data 306.

The control unit 110 determines that representations 301A and 301B correspond to the same object (i.e., a human) using the association of descriptor features specified by dual descriptor data 306. In this way, dual descriptor data 306 allows control unit 110 to recognize and track an object between frames even though the location of the object representation and the detected characteristics/features of the object representation have both changed between frames.

Figure 4A:
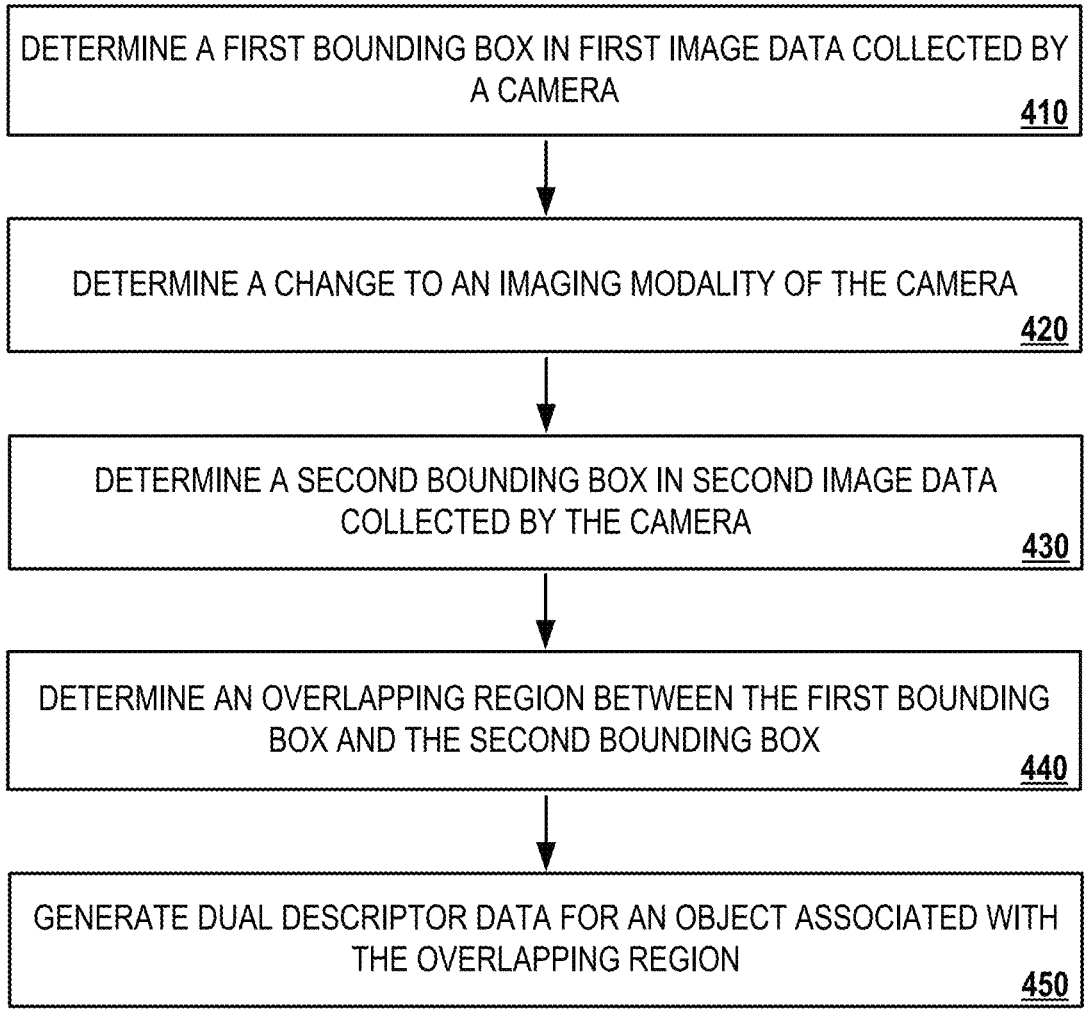
FIGS. 4A and 4B show examples of processes for using dual descriptor data for recognizing objects in low light conditions.
Figure 4B:
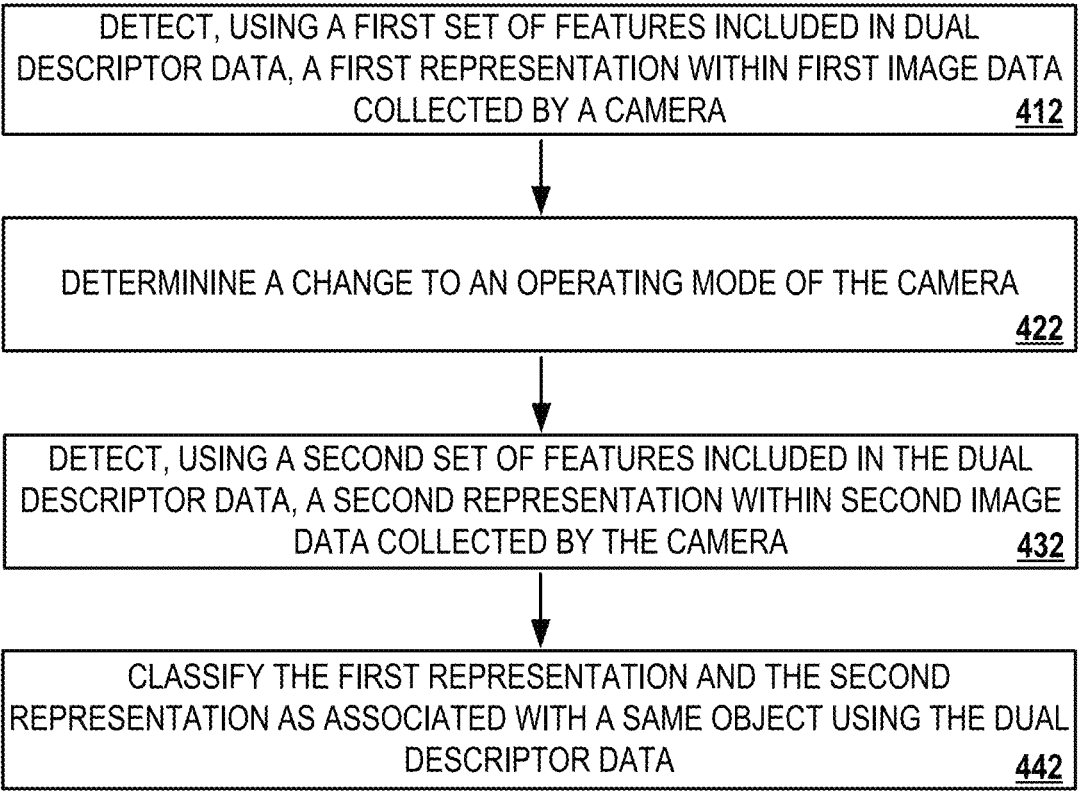

FIGS. 4A and 4B show examples of processes 400A and 400B for using dual descriptor data for recognizing objects in low light conditions. Referring initially to FIG. 4A, an example of a process 400A for generating dual descriptor data is depicted. The process 400A includes the operations of determining a first bounding box in first image data collected by a camera (410), determining a change to an imaging modality of the camera (420), determining a second bounding box in second image data collected by the camera (430), determining an overlapping region between the first bounding box and the second bounding box (440), and generating a dual descriptor for an object associated with the overlapping region (450).

In general, a system (e.g., system 100) can implement process 400A to perform initial registration of a detected object representation with dual descriptor data. For example, as shown in FIGS. 2A and 2B, an object corresponding to bounding boxes 202A and 202B can be registered using process 400A to generate dual descriptor data. The descriptions below focus on control unit 110 performing the process 400A for brevity. In some other implementations, the process 400A can be performed by one or more components of system 100, such as camera 120, server 140 or a combination of components. In some instances, camera 120 locally captures image data and transmits the image data to control unit 110 or server 140 for object registration using bounding boxes. In such instances, control unit 110 and/or server 140 can identify bounding boxes using regions of the image data corresponding to a detected representation. In some other instances, camera 120 identifies bounding boxes corresponding to representations within image data and control unit 110 and/or server 140 identify an overlapping region between two or more bounding boxes.

In more detail, the process 400A includes the operation of determining a first bounding box in first image data collected by a camera (410). For example, control unit 110 determines a bounding box 202A for a representation detected in a first image collected by camera 120. As discussed in reference to FIG. 2A, the camera 120 uses IR sensor 120A to collect the first image given the limited amount of light in the kitchen during image capture. In this example, the first image is an IR image and features associated with bounding box 202A include IR descriptor features.

The process 400A includes the operation of determining a change to an imaging modality of the camera (420). For example, control unit 110 determines a change to the imaging modality of camera 120 based on an adjustment to nearby ambient lighting conditions. In the example depicted in FIG. 2A, a user activates a light switch that turns on a kitchen light. This happens after the camera 120 has collected the first image (from which bounding box 202A is identified). Camera 120 adjusts the imaging modality from IR mode (collecting image data using IR sensor 120A) to RGB mode (collecting image data using RGB sensor 120B).

In some implementations, a user can choose to change the lights to cause the system to determine the change in the imaging modality of the camera.

The process 400A includes the operation of determining a second bounding box in second image data collected by the camera (430). For example, control unit 110 determines a bounding box 202B for a representation detected in a second image collected by camera 120. As discussed in reference to FIG. 2A, the camera 120 uses RGB sensor 120B to collect the second image given the increased amount of light in the kitchen during image capture. In this example, the second image is an RGB image and features associated with bounding box 202B include RGB descriptor features.

The process 400A includes the operation of determining an overlapping region between the first bounding box and the second bounding box (440). For example, control unit 110 determines an overlapping region 202C between bounding boxes 202A and 202B. As discussed in reference to FIG. 2B, the overlapping region reflects a respective portion from the first and second images that correspond to the same object. In the example shown in FIG. 2B, the object is a human captured in images collected by camera 120 during a change in lighting conditions in the kitchen. In this example, there is a high likelihood that representations in the first and second images correspond to the same object given the relatively short time period (e.g., two minutes) within which the two images are captured.

In some implementations, the system may request a user to manually confirm that detected representations in two or more images collected by camera 120 represent the same object when implementing process 400A. In such implementations, the system may perform coarse object recognition techniques to make a preliminary determination that two representations are likely to represent the same object. The system can then provide a notification to user device 130 to confirm the preliminary determination. In some instances, the system may periodically perform coarse object recognition on an ongoing basis as new objects are detected in a property. For example, if a first representation of a new object is identified at a first time, then the system may queue the registration process so that when a second representation is subsequently at a second time with detected with similar features, a notification may be provided to a user to confirm whether the two representations correspond to the same object.

The process 400A includes the operation of generating a dual descriptor for an object associated with the overlapping region (450). For example, control unit 110 may generate a dual descriptor that associates two or more descriptor templates for an object associated with the overlapping region identified in the previous step. In the example depicted in FIG. 2B, control unit 110 generates dual descriptor data for an object (human) that associates a first descriptor template (IR descriptor features) and a second descriptor template (RGB descriptor features). By using a dual descriptor for the same object, the system can use fewer computer resources to store the attributes of the object, compared to storing two distinct sets of attributes for the same object. In some implementations, the system can train the object recognition model more quickly compared to a conventional system that does not employ dual descriptors.

Referring now to FIG. 4B, an example of a process 400B for applying dual descriptor data in recognizing objects in low light conditions is depicted. The process 400B includes the operations of detecting, using a first set of descriptor features included in dual descriptor data, a first representation within first image data collected by a camera (412), determining a change to an operating mode of the camera (422), detecting, using a second set of features included in the dual descriptor data, a second representation within second image data collected by the camera (432), and classifying the first representation and the second representation as associated with a same object using the dual descriptor data (442).

In general, a system (e.g., system 100) can implement process 400B to perform object recognition of representations identified in image data using dual descriptor data. For example, as shown in FIG. 3, the system can use dual descriptor data 306 to recognize representations 301A and 301B as corresponding to the same object (human). The descriptions below focus on control unit 110 performing the process 400A for brevity. In some other implementations, the process 400B can be performed by one or more components of system 100, such as camera 120, server 140 or a combination of components. In some instances, the camera 120 locally captures image data and transmits the image data to control unit 110 or server 140 for processing. In such instances, control unit 110, server 140, or both perform object detection, recognition, or both using dual descriptor data 142. In some other instances, camera 120 locally performs detection of representations within image data and control unit 110, server 140, or both perform object recognition associated with the detected representations.

In more detail, the process 400B includes the operation of detecting, using a first set of features included in dual descriptor data, a first representation within first image data collected by a camera (412). For example, as shown in FIG. 3, control unit 110 detects a representation 301A in image data 302A based on features specified in the IR descriptor template in dual descriptor data 306. In this example, control unit 110 applies features specified in the IR descriptor template since image data 302A represents an IR image collected by IR sensor 120A of camera 120.

The process 400B includes the operation of determining a change to an operating mode of the camera (422). For example, as shown in FIG. 3, control unit 110 determines a change in an operating mode of camera 120 due to a change in ambient lighting conditions. In this example, the increase in ambient light (produced by the porch light being turned on) causes the camera to change its image capture mode so that image data is collected by RGB sensor 120B.

The process 400B includes the operation of detecting, using a second set of features included in the dual descriptor data, a second representation within second image data collected by the camera (432). For example, as shown in FIG. 3, control unit 110 detects a representation 301B in image data 302B using features specified in the RGB descriptor template in dual descriptor data 306. In this example, control unit 110 applies features specified in the RGB descriptor template since image data 302B represents an RGB image collected by RGB sensor 120B of camera 120.

In some implementations, upon obtaining second image data, the system can check dual descriptor data 306 to determine if a descriptor template is specified for the second image data. For instance, in the example depicted in FIG. 3 (where image data 302A is an IR image and image data 302B is an RGB image), the system may check to determine if an RGB descriptor template exists for representation 301B detected in image data 302B. In some circumstances, such as when a descriptor template is not available, the system may initiate the bounding box registration process depicted in FIGS. 2A and 2B. In such circumstances, the system may generate a new descriptor template (as shown in FIGS. 2A and 2B) and update the dual descriptor data 306 using the newly generated descriptor template.

In some implementations, the system may periodically check the correspondence of features of a recognized object within collected image data against features specified in dual descriptor data 306 to determine whether to update descriptor templates specified in the dual descriptor data 306. For example, if an object's appearance has changed over time since a bounding box registration process was previously performed, then the system may update the descriptor templates within the dual descriptor data 306 to reflect updated object features. In such examples, the system may use confidence levels to determine whether a set of detected object features bears a threshold level of resemblance to object features used during the bounding box registration process (e.g., greater than 60% similarity between two sets of features satisfies the threshold similarity).

The process 400B includes the operation of classifying the first representation and the second representation as associated with a same object based on the dual descriptor data (442). For example, as shown in FIG. 3, control unit 110 classifies representations 301A and 301B as being associated with the same object (human) using an association of descriptor features specified in dual descriptor data 306. As described throughout, the association specified in dual descriptor data 306 improves object recognition and/or tracking since this allows the system to associate object representations even though the location of the object representations and the detected characteristics/features of the object representations change between frames.

In some implementations, in response to classifying the first representation and the second representation as associated with the same object using the dual descriptor data, the system 100 can transmit instructions to appliances in the system 100 to perform various operations. For example, the first representation can be a resident during ambient conditions with which the resident is recognizable to the system, and the second representation can be the same resident during IR conditions with which the resident is initially unrecognizable to the system. In response to classifying the first representation and the second representation as associated with the same resident on the dual descriptor data, the system transmit instructions to connected appliances over a network or computer element, e.g., to unlock doors, send a notification to a user device of a different resident that the resident is arriving at home, begin scheduled event, such as turning on air conditioning, and the like.

In some implementations, the notifications and instructions can be sent over a network using a transmitter. The network can be WiFi or cellular. In some implementations, the notification or instructions are displayed visually on a user interface of the user device or appliance or produce an audible alert from the user device or appliance. In some implementations, the system 100 can continue to track an object even when lighting conditions and the imaging mode of the camera change during the tracking.

Through classifying the representations using dual descriptors, the system can reduce the amount of time taken to recognize and track the object and reduce the likelihood of not recognizing an object in one set of lighting conditions, though it is recognizable in another set of lighting conditions.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising one or more computers and one or more storage devices on which are stored instructions that are operable, when executed by the one or more computers, to cause the one or more computers to perform operations comprising:
  generating dual descriptor data, which comprises:
    determining a first bounding box in first image data collected by a camera,
    determining a second bounding box in second image data collected by the camera,
    determining an overlapping region between the first bounding box and the second bounding box, and
    generating the dual descriptor data for an object associated with the overlapping region;
  detecting, using a first set of descriptor features included in the dual descriptor data, a first representation within first image data collected by the camera with a first imaging modality;
  determining a change to an imaging modality of the camera from the first imaging modality to a second imaging modality;
  detecting, using a second, different set of features included in the dual descriptor data, a second representation within second image data collected by the camera with the second imaging modality;
  classifying the first representation and the second representation as associated with a same object using the dual descriptor data; and
  in response to classifying the first representation and the second representation as associated with the same object using the dual descriptor data, transmitting operational instructions to one or more appliances connected to the system.

2. The system of claim 1, wherein the camera comprises an RGB sensor and an IR sensor, the change to the imaging modality of the camera comprises a change in using the IR sensor to the RGB sensor or in using an RGB sensor to an IR sensor.

3. The system of claim 1, wherein the operations further comprise detecting, by the camera, a change in lighting conditions; and
  wherein determining the change to the imaging modality of the camera is in response to detecting the change in the lighting conditions.

4. The system of claim 1, wherein the classifying of the first representation and the second representation as associated with the same object using the dual descriptor data comprises determining that object features of the same object satisfy a threshold for resembling object features used in generating the dual descriptor data.

5. The system of claim 1, wherein the first representation has a first location in the first image data, and the second representation has a second location in the second image data, and the first and second locations (i) are different and (ii) indicate movement.

6. The system of claim 1, wherein the classifying of the first representation and the second representation as associated with the same object using the dual descriptor data uses a time period between capturing the first and second image data.

7. The system of claim 1, wherein the operations further comprise providing, to a user device, a notification asking for confirmation that the first representation and the second representation are associated with the same object.

8. The system of claim 7, wherein the operations further comprise receiving, from the user device, feedback indicating that the first representation and the second representation are associated with the same object.

9. The system of claim 1, wherein the detecting, using the second set of features specified in the dual descriptor data, of the second representation within second image data comprises:
  determining that a descriptor template is not specified for the second image data;
  in response to determining that a descriptor template is not specified for the second image data, initiate a bounding box registration process, thereby generating a new descriptor template; and
  updating the dual descriptor data with the new descriptor template.

10. The system of claim 1, wherein the dual descriptor data for the object comprises object attributes in different imaging modalities with the object.

11. The system of claim 1, wherein:
  the operations further comprise determining that the object is unrecognized to the system; and
  the determining of the first bounding box in the first image data is in response to determining that the object is unrecognized.

12. The system of claim 1, wherein the operations further comprise providing, to a user device, a notification asking for confirmation that a representation within the first bounding box and a representation within the second bounding box correspond to a same object.

13. The system of claim 12, wherein the operations further comprise receiving, from the user device, feedback indicating that a representation within the first bounding box and a representation within the second bounding box correspond to a same object.

14. The system of claim 1, wherein the operations further comprise:
  determining that the object is recognized to the system;
  comparing the generated dual descriptor data for the object with a feature template of the dual descriptor data; and
  updating the feature template of the dual descriptor data with the generated dual descriptor data.

15. A non-transitory computer storage medium encoded with instructions that, when executed by one or more computers, cause the one or more computers to perform operations comprising:
  generating dual descriptor data, which comprises:
    determining a first bounding box in first image data collected by a camera,
    determining a second bounding box in second image data collected by the camera,
    determining an overlapping region between the first bounding box and the second bounding box, and
    generating the dual descriptor data for an object associated with the overlapping region;
  detecting, using a first set of descriptor features specified in the dual descriptor data, a first representation within first image data collected by the camera with a first imaging modality;
  determining a change to an operating mode of the camera from the first imaging modality to a second imaging modality;
  detecting, using a second, different set of features specified in the dual descriptor data, a second representation within second image data collected by the camera with the second imaging modality;
  classifying the first representation and the second representation as associated with a same object using the dual descriptor data; and in response to classifying the first representation and the second representation as associated with the same object using the dual descriptor data, sending operational instructions to one or more appliances.

16. The computer storage medium of claim 15, wherein the camera comprises an RGB sensor and an IR sensor, the change to the operating mode of the camera comprises a change in using the IR sensor to the RGB sensor or in using an RGB sensor to an IR sensor.

17. The computer storage medium of claim 16, wherein the operations further comprise detecting, by the camera, a change in lighting conditions; and
   wherein determining the change to the operating mode of the camera is in response to detecting the change in the lighting conditions.

18. The computer storage medium of claim 15, wherein the dual descriptor data for the object comprises object attributes in different imaging modalities with the object.

19. The computer storage medium of claim 15, wherein the classifying of the first representation and the second representation as associated with the same object using the dual descriptor data comprises determining that object features of the same object satisfy a threshold for resembling object features used in generating the dual descriptor data.

20. The computer storage medium of claim 15, wherein the first representation has a first location in the first image data, and the second representation has a second location in the second image data, and the first and second locations (i) are different and (ii) indicate movement.

* * * * *